United States Patent [19]

Menot et al.

[11] 4,271,505

[45] Jun. 2, 1981

[54] PROCESS COMMUNICATION LINK

[75] Inventors: Robert Menot, North Easton; Robert E. Willard, Foxboro; Paul D. Griem, Medway; Guy E. Devine, Plainville, all of Mass.

[73] Assignee: The Foxboro Company, Foxboro, Mass.

[21] Appl. No.: 54,201

[22] Filed: Jul. 2, 1979

[51] Int. Cl.³ .............................................. H04J 6/00
[52] U.S. Cl. ...................................... 370/85; 370/92; 370/95
[58] Field of Search ....................... 370/85, 91, 92, 94, 370/95, 89, 90

[56] References Cited

U.S. PATENT DOCUMENTS

| 3,597,549 | 8/1971 | Farmer | 370/88 |
| 3,659,271 | 4/1972 | Collins | 370/88 |
| 3,818,447 | 6/1974 | Craft | 370/85 |
| 3,851,104 | 11/1974 | Willard | 370/85 |
| 3,961,139 | 6/1976 | Bowman | 370/89 |

*Primary Examiner*—David L. Stewart
*Attorney, Agent, or Firm*—Anthony N. Fiore, Jr.; Andrew T. Karnakis

[57] ABSTRACT

A distributed, electronic process control system is disclosed having a plurality of remotely located stations interacting to control a complex industrial process. The stations communicate via a process communication link which supports secure, multi-master communication. The link provides a transparent medium of exchange for the secure transfer of process status and control information among the stations, such that each station may initiate and control system communication for a predetermined time period.

18 Claims, 21 Drawing Figures

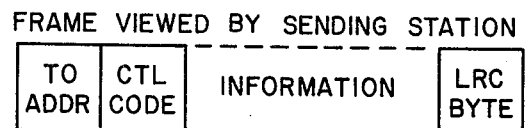
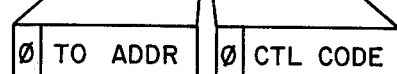
FIG. 4a
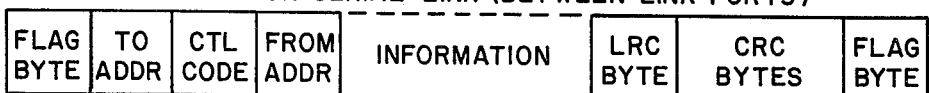
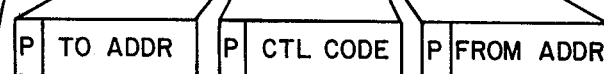
FIG. 4b
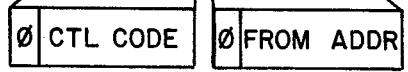
FIG. 4c

FIG. II

PROCESS COMMUNICATION LINK

BACKGROUND OF THE INVENTION

1. Field of the Invention

The present invention relates generally to distributed, electronic process control systems having a number of remotely located stations interactively communicating in the control of a complex industrial process. More particularly, this invention relates to a method and apparatus for providing a secure, multimaster communication path among a plurality of remotely located stations of a process system.

2. Description of the Prior Art

The complexity of industrial processes being monitored and controlled has evolved from simple single control-loop processes to very complex processes often having hundreds of control loops. Industrial process control equipment has followed this evolution. From very simple analog controllers, today's process control equipment has developed into sophisticated electronic systems, often including digital computers.

One level of this sophistication is the use of distributed systems that call for individual stations to be remotely positioned throughout the process plant or centrally located, but separate from, the operator's control room. The stations are typically connected for communication with one another via a number of transmission cables stretching throughout the plant. As the process becomes more and more complex, the number of stations, and thus the cables, increases dramatically. This increase in cables greatly reduces system reliability, and increases system cost.

To reduce the number of cables, one prior art proposal teaches a polling technique in which all the stations are connected by a single cable, or by two cables if redundancy is desired.

A supervisory controller, typically a host computer, is centrally located and connected to all stations by the cable. The supervisory controller is the master of all communication and "polls" all stations according to their respective priorities to determine if the polled station wishes to communicate with another station.

If a station answers affirmatively, the supervisory controller acknowledges and waits until the communication is completed to restart its polling of the stations. If a station answers negatively, the supervisory controller polls the next station in line.

This technique is acceptable for use with processes having slowly varying process variables. It is not acceptable if the process variables change rapidly. For if the rate of change of a process variable is greater than the frequency at which its respective station is polled, variations in the variable may be missed, possibly causing a disruption or "bump" in the process under control. These bumps can cause severe safety problems, especially if an alarm limit indication is missed.

Two other factors negate the utility of this technique in a process control environment. First, the supervisory controller is a single-point-failure element. If the supervisory controller fails, all system communication, and thus process control, is disabled. Second, the stations, once allowed to communicate, may do so indefinitely, completely disabling communication by the other stations. This can also lead to missed indications, and more severely, to a complete loss of system communication due to the blocking effect of the then communicating stations. A loss of communication, which if produced, could completely disable all control of the process.

SUMMARY OF THE INVENTION

In accordance with one aspect of the present invention, a method is provided for supporting communication among the stations of a distributed, electronic process control system according to a secure, multi-master technique. In one illustrated embodiment, a process communication link is disclosed which employs a station-initiated arbitration technique for granting to a selected one of the stations master control of system communication. Communication security is provided by a timer-based revocation scheme by which the link time-limits the grant of master control of system communication to a predetermined time-period.

Therefore, it is an object of the present invention to provide improved methods and apparatus for supporting communication among the stations of a distributed process control system. Other objects, aspects and advantages of the present invention will be pointed out in, or apparent from the following detailed description of a preferred embodiment, considered together with the accompanying drawings.

In order that the invention may be more thoroughly understood and readily carried into effect, the same will now be discussed more fully, by way of example only, with reference to the accompanying drawings.

BRIEF DESCRIPTION OF THE DRAWINGS

FIG. 4A illustrates the frame format as seen by the sending station;

FIG. 4B illustrates the frame format as viewed by the link;

FIG. 4C illustrates the frame format as viewed by the receiving station;

DESCRIPTION OF THE PREFERRED EMBODIMENT

Referring to the accompanying drawings, the present invention will now be discussed in detail.

1. General Description

Figure 1:
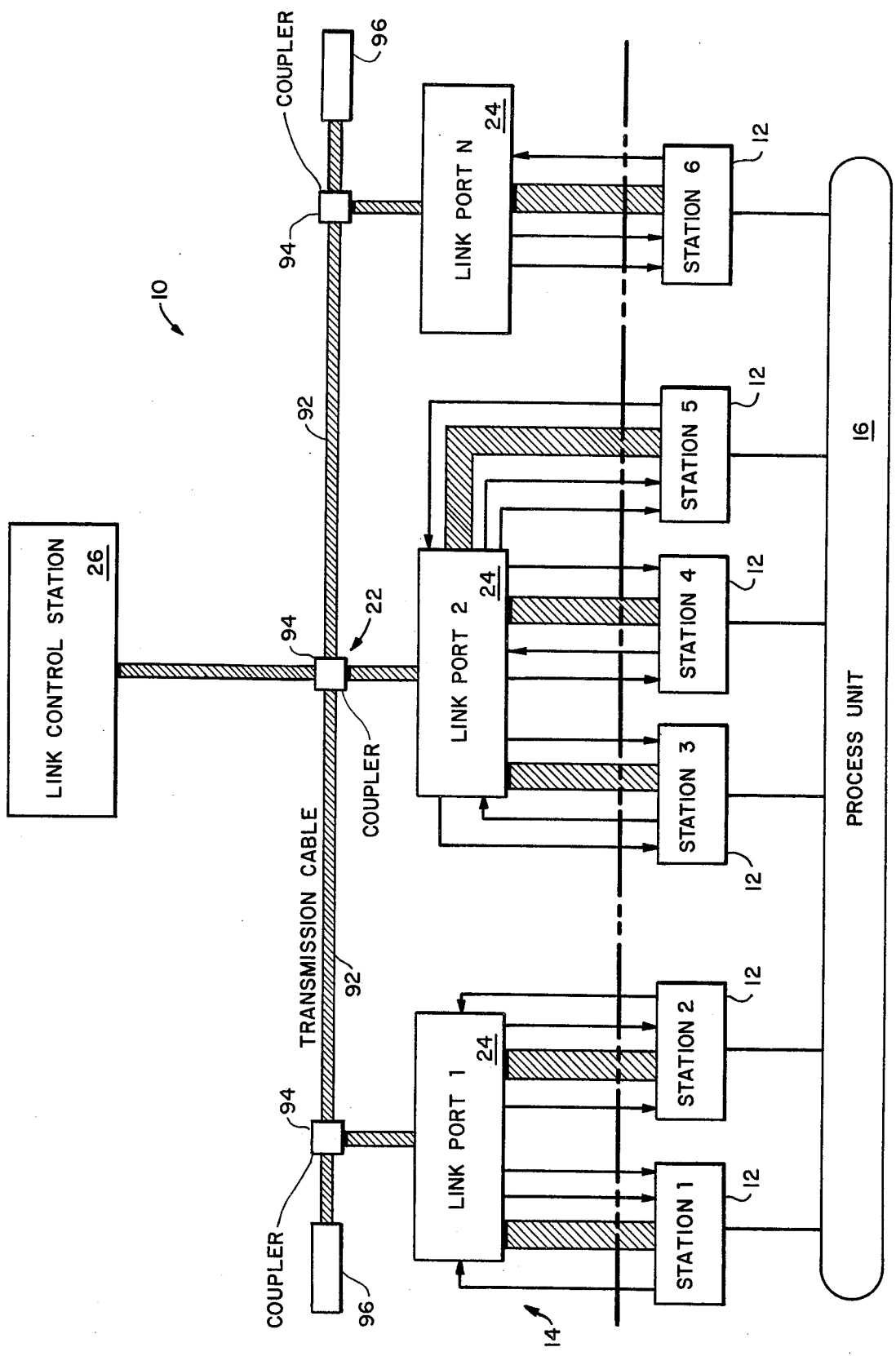
FIG. 1 illustrates a distributed, electronic process control system embodying the present invention.

FIG. 1 illustrates a distributed, electronic process control system 10 embodying the present invention. The system 10 includes a number of remotely located stations 12 interactively communicating via a process communication link 14 in the control of a process unit 16. The process unit 16 may comprise a single process having a large number of process conditions, such as a complex industrial process; or "clusters" of individual processes each having respective process conditions. The link 14 operates in a secure, multi-master mode which allows each station 12 to initiate and control system communication for a predetermined time-period.

Any of the stations 12 may receive a communication. Stations which have the additional ability to initiate a communication are termed "master-stations"; stations which do not have this ability are termed "slave-stations". Also, a station which initiates communication with another station is called the "master" during the time-period of its communication; the other station is called the "slave". Thus, a particular station may be a master during one communication, and a slave during another communication.

Figure 5:
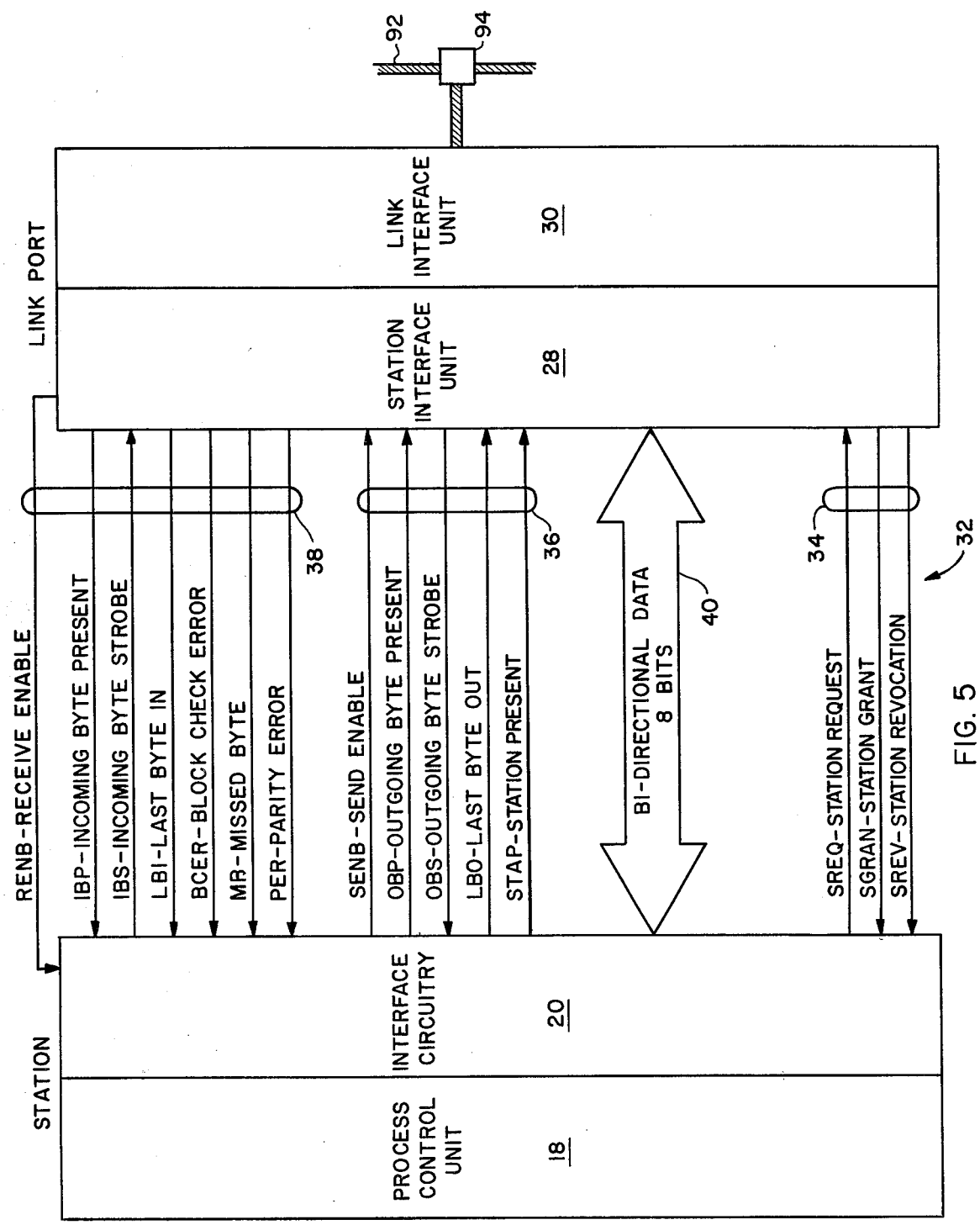
FIG. 5 illustrates the link port station interface.

Each of the stations 12 includes a process control unit 18 and interface circuitry 20, as shown in FIG. 5. The process control units 18 may include:

(1) analog and digital control units for producing in response to a respective set-point signal a control signal for operating a corresponding process device thereby to effect the desired control of a respective process condition. An example of such a station/process device interaction is the application of an analog controller output for controlling a valve thereby to effect a desired change in the flow rate of a process stream.

(2) digital computers for calculating updated values of the set-point signals with changing process conditions and for effecting Direct Digital Control (DDC) over respective process conditions.

(3) video display terminals for presenting to an operator the status of the process unit or various control loops thereof, and (4) data entry terminals for allowing operator control over the process.

Examples of such process control units may be found in U.S. Pat. Nos. 3,971,000 and RE 29,685, assigned to the Assignee of the present application.

The interface circuits 20 provide their respective stations with means for acquiring master control of system communication, and once acquired, for interfacing with the link 14. The circuits 18 function as peripheral controllers for providing a compatible interface between their respective process units 18 and the link 14. Interface circuits of this type are commonly used in distributed control systems, and may be implemented in a number of different designs well-known to those skilled in the art. For examples of interface circuits see U.S. Pat. Nos. 3,971,000 and 4,001,807.

The link 14 employs a station-initiated arbitration technique for granting to a selected one of the stations 12 master control of system communication. In this manner, each station may request to initiate a communication at any time, rather than only at specified time-periods. Once a given station is selected as a master station it may communicate via the link 14 with one of the remaining stations individually, or with all of the remaining stations simultaneously.

Communication security is provided by a timer-based revocation scheme. The link 14 time-limits the grant of master control of system communication to a predetermined time-period. Thus, no station may retain control over system for communication for prolonged time-periods, thereby reducing the effective "wait" of a station to communicate.

The link 14 may be configured for two modes of operation-EXTENDED and LOCAL. As shown in FIG. 1, the link 14 is configured for EXTENDED operation and includes a transmission cable assembly 22, a number of link ports 24, and a link control station 26. EXTENDED operation is best utilized when the process unit 16 to be controlled has a large number of process conditions, and thus, a correspondingly large number of stations.

Figure 2:
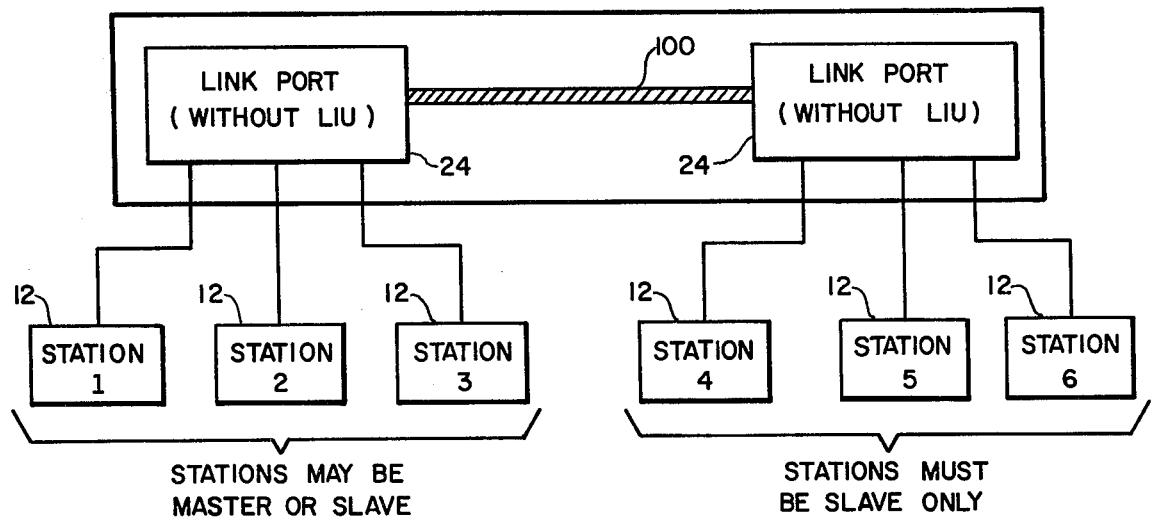
FIG. 2 illustrates the LOCAL mode of the present invention.

Conversely, if the process unit 16 to be controlled has a small number of process conditions, then LOCAL operation is more efficient. FIG. 2 illustrates the link 14 as configured for LOCAL operation.

From the station's point of view, the configuration of the link 14 is transparent. The stations 12 communicate with the link 14 in the same manner, whether the link is in an EXTENDED or LOCAL mode. The main difference between EXTENDED and LOCAL operation is the presence or absence of the link control station 26 and the transmission cable assembly 22. Due to the large number of stations in the EXTENDED mode, the link control station 26 is provided to support a second level of arbitration for resolving contention among groups of stations for master control of system communication. Thus, in EXTENDED mode two levels of arbitration are provided, one at the station level, and one at the group level.

System communication is generally request/reply, half-duplex, between a single master/slave pair. The exception is a simultaneous (BROADCAST) communication for which there is no reply. The link 14 operates at a 1 mbps rate using differentially encoded Phase Shift Keying (PSK) modulation.

The stations 12 communicate according to a predetermined protocol having basic frame format similar to Synchronous Data Link Control (SDLC), an IBM developed link level protocol. An explanation of SDLC is presented in "Synchronous Data Link Control: A Perspective," by R. A. Donnan and J. R. Kersey, published in IBM Systems Journal No. 2, 1974.

2. Link Protocol Description

Figure 3:
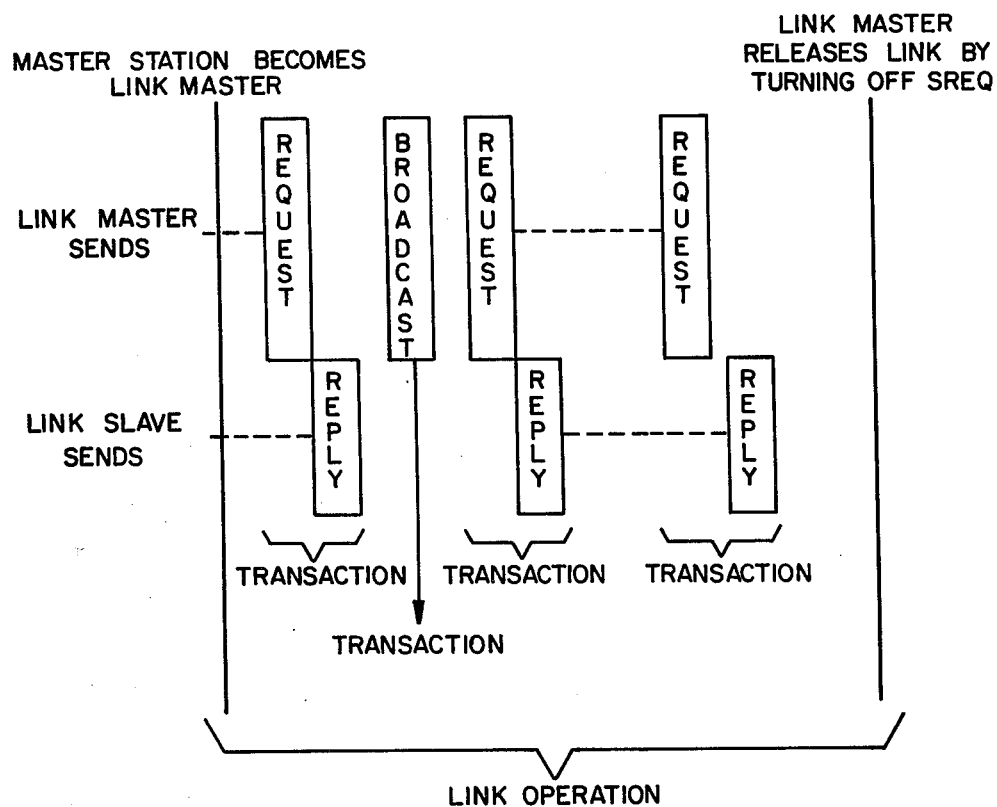
FIG. 3 shows the link transaction protocol.

FIG. 3 illustrates the operation of the link's communication protocol to which all requests and replies must conform.

Three frame types are defined. They are: (1) REQUEST frame, (2) REPLY frame and (3) BROADCAST frame. The BROADCAST frame is used for simultaneous transmission from one station to all of the remaining stations, and does not have a reply.

Once a station becomes a master station (as described in detail below), it will initiate communication by sending a REQUEST frame. A REQUEST frame may or may not include data depending on the nature of the request. Unless the request was a BROADCAST frame, one of two reply types will be sent by the receiving station. The two types of replies are:

NORMAL REPLY—The master station sends a message to the slave. The slave performs the requested function and replies upon completion.

DEFERRED RESPONSE—The master station sends a message to the slave, and immediately upon receiving the message the slave replies signifying only the acceptance of the message. Some time later, after completion of the requested function, the slave initiates a message to the master station with the true response to the original request.

As shown in FIG. 3, a transmission followed by receipt of a reply, or the issuance of a BROADCAST frame by a master station constitutes a Link Transaction. A series of transactions by the same link master constitutes a Link Operation.

There are two timeouts associated with system communication. These timeouts are for security purposes to assure proper communication flow and include:

1. Link Hold Timeout (LHTO)—All link operations must be completed in this time period, or a termination signal (SREV), will be received by all stations actively engaged in the communications. Preferably, LHTO is 100 ms.
2. Reply Timeout (RPTO)—All requests that require a reply must begin to be received by the present Link Master within this time-period which is measured from the time the last bytes was transferred by the station; preferably, RPTO is 20 ms.

FIGS. 4A, 4B and 4C illustrate the frame format defined by the link protocol at various points along the link 14. For purposes of clarity, the frame as viewed by the transmission cable assembly 22 will be discussed.

Two special bytes are defined in the frame to facilitate orderly message flow. The first is the FLAG BYTE positioned at the beginning and end of each frame. The FLAG BYTE is a unique combination of 8 bits (01111110) used for frame delimiting to provide variable length transmissions.

The second special byte is the NULL BYTE. This byte is also a unique combination of 8 bits, which is used to provide a "time-fill" function. That is, when a sending station cannot transmit at the link's data rate (1 mbps), NULL BYTES are inserted to fill the relative gaps in communication due to the slower transmission rate of the sending station. The insertion and deletion of the NULL and FLAG BYTES are provided for by the link ports 24.

The frame also includes address and information bytes, as well as transmission error checking bytes. These bytes are defined as follows:

| | |
|---|---|
| TO ADDRESS (TO ADDR) | This is the address of the station to which the frame is being sent. The address length is 7 bits plus a parity bit. |
| CONTROL CODE (CTL CODE) | A code that specifies the nature of the frame. Table 1 defines typical control codes. Each code is 7 bits plus parity in length. |
| FROM ADDRESS (FROM ADDR) | The address of the station from which the frame is being sent. The length of the address is 7 bits plus parity. |
| INFORMATION | A variable length space for data representing process station and control information for transfer to the receiving station. |
| LRC | A position-sensitive, even-parity, error checking byte. Parity is accumu-lated on all bytes in the frame except FLAGS, NULLS, and CRC bytes (see below). |
| BLOCK CHECK (CRC) | A 16 bit, Cyclic Redundancy Check (CRC) error check code. The CRC is accumulated on all bytes in a frame except FLAGS and NULLS. |
| PARITY BITS | The parity bits shown in exploded view in FIGS. 4A, 4B and 4C are odd parity |

TABLE 1
TYPICAL CONTROL CODES

| MNE-MONIC | NAME | STATION USAGE |
|---|---|---|
| SSS | Send Station Status | Request Data from Slave |
| SBM | Send a Block Message | Request Data from Slave |
| CSS | Copy Station Status | Transmit Data to Slave |
| CBM | Copy Block Message | Transmit Data to Slave |
| ETC | Execute this Command | Control of Slave |
| DRC | Deferred Response | |
| ACK | Acknowledge | Slave Reply |
| NAKX | Negative Acknowledge | Slave Reply |
| WACK | Wait Acknowledge | Slave Reply |
| IMOK | I am OK | Status |
| BCBM | Broadcast, Copy a Block Message | Transmit to all Slaves |
| BETC | Broadcast, Execute This Command | Control of all Slaves |

3. Link Interface

The link ports 24 provide the interface for the stations 12 to the link 14. Each link port provides access to the link for a respective number or group of stations, and includes, as shown in FIG. 5, a Station Interface Unit (SIU) 28, and a Link Interface Unit (LIU) 30.

Figure 6A:
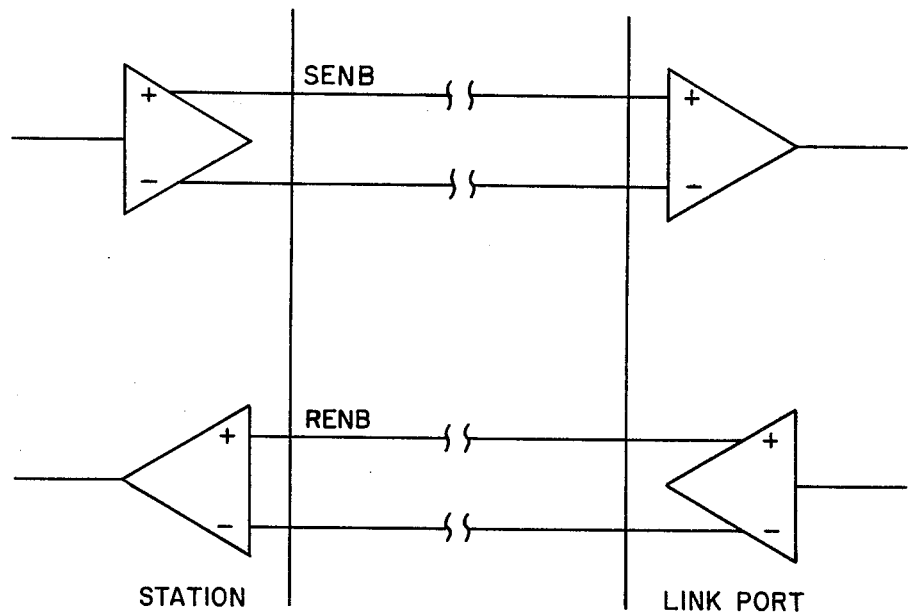
FIG. 6A illustrates schematically a differential link port to station data line.
Figure 6B:
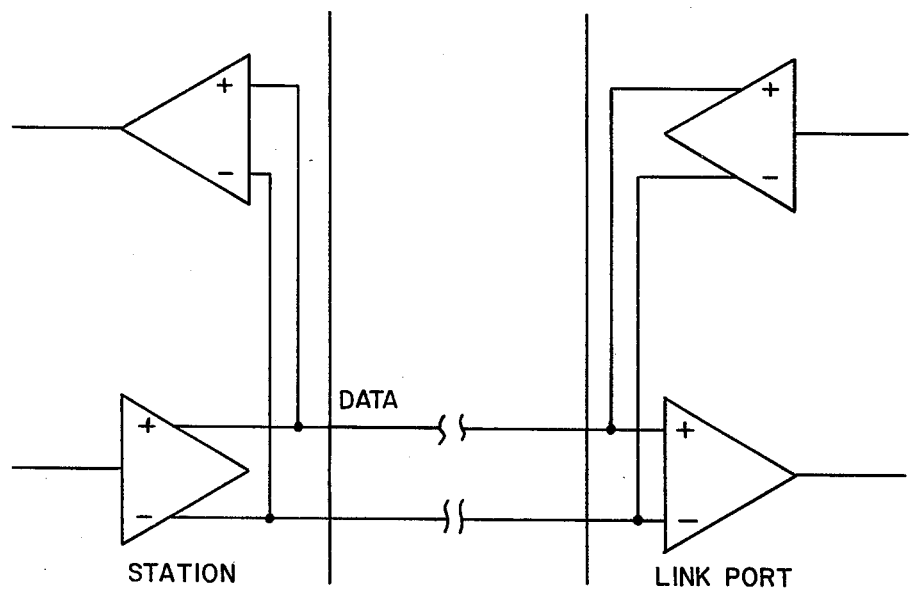
FIG. 6B illustrates schematically a differential link port to station control line.

There exists between each station and link port a dedicated interface comprising, on the station side, interface circuitry 20, and on the link port side, an SIU 28. These units communicate via 23 pairs of data and control lines 32. Each line 32 is of a differential nature, having a respective driver and receiver. Preferably, each pair of lines 32 is made through a shielded cable having its shield connected to electrical common at the link port side of the interface. A typical station to link port interface is shown schematically in FIGS. 6A and 6B.

The data and control lines 32 include handshaking lines 34, Transmit Data Control lines 36, Receive Data Control lines 38 and an 8 bit, parallel data bus 40.

The handshaking lines 34 are related to the mastership control and security functions of the link 14, and include a STATION REQUEST FLAG (SREQ), a STATION GRANT FLAG (SGRAN), and a STATION REVOCATION (SREV) signal. These lines are only used by master stations and function as follows:

| | |
|---|---|
| STATION REQUEST FLAG (SREQ) | This flag is activated by the station's interface circuitry 20 to indicate its desire to become a master station. |
| STATION GRANT FLAG (SGRAN) | This flag is activated by a link port to indicate to a requesting station its selection as a master station. |
| STATION REVOCATION SIGNAL (SREV) | This is activated by the link ports to indicate a violation of the LHTO period. Any station receiving this signal (i.e., the master station and its associated slave(s)) will immediately cease communication. |

The Transmit Data Control Signals 36 and the Receive Data Control Signals 38 are activated to control the bi-directional transfer of data across the interface. Data is transferred in a byte serial, bit parallel fashion. For purposes of convention only, the terms "output data" and "input data" will refer to data flow with respect to the stations 12. Thus, "output data" indicates data flow from a station to a link port and "input data" indicates flow from a link port to a station.

The Transmit Data Control Signals 36 have the following functions:

| | |
|---|---|
| STAP | Station Present - This signal indicates the availability of the station for communication. When false, all communication with the station is disabled. |
| SENB | Send Enable - This signal is station activated concurrent with the leading edge of data being placed on the bus 40, and remains active for the duration of the entire communications. SENB is deactivated concurrent with the trailing edge of LBO (see below). |
| OBP | Outgoing Byte Present - This signal is activated by a station whenever a data byte is placed on the bus 40 for transmission to another station. The link port will transfer the byte by activating OBS (see below). |
| OBS | Outgoing Byte Strobe - activated by the link port in response to OBP to cause a byte-transfer. The station may send another byte (i.e., activate OBP) any time after OBS is deactivated. |
| LBO | Last Byte Out - activated by a station concurrent with OBP when the final byte in the communication frame has been placed on the data bus 40. |

The Receive Data Control Signals have the following functions:

| | |
|---|---|
| RENB | Receive Enable - Activated by the link port to indicate to a station the start of a data transfer from the link port. |
| IBP | Incoming Byte Present - Activated by the link port whenever a Byte is presented on the data bus for transfer to the station. The transfer is accomplished when the station activates IBS (see below). Once IBS is activated, IBP is deactivated. |
| IBS | Incoming Byte Strobe - Activated by the station in response to IBP to transfer the byte from the link port to the station. |
| LBI | Last Byte In - activated by the link port concurrent with IBP to indicate that the byte is the last byte in the communication frame. |
| BCER | Block Check Error - activated by the link port concurrent with LBI to indicate a failure of Block Check. |
| MB | Missed Byte - activated by the station to indicate that one or more bytes were "missed". This will result whenever a station has failed to keep up with the IBP signals. MB is not functional during a simultaneous (BROADCAST) transmission. |
| PER | Parity Error - activated by the link port concurrent with IBP to indicate a parity error in the frame. Should a PER occur, the station will ignore the remainder of the frame and make no reply. |

Figure 7:
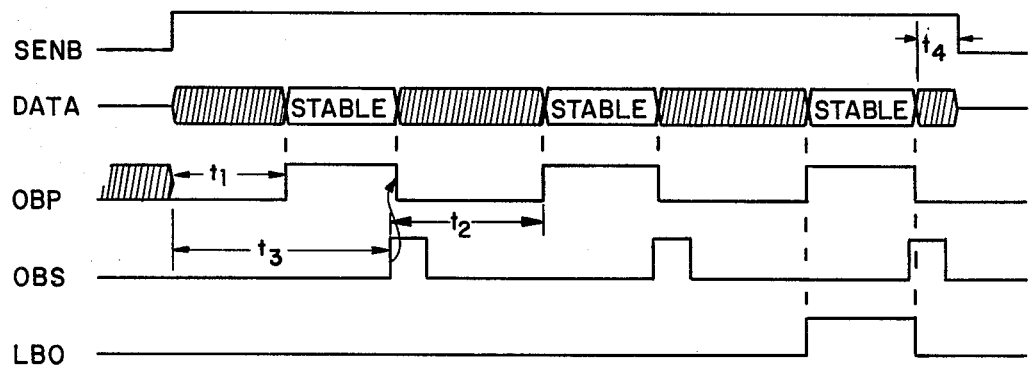
FIG. 7 illustrates the station to link port timing diagram.

FIG. 7 illustrates the timing diagram for a station-to-link port transfer. For purposes of the present discussion, it will be assumed that the station in question has been previously selected as a master station. The station initiates the transfer by raising its SENB line which causes the link port to send a preamble. At the completion of the preamble, the link port samples the OBP line and continues the sampling once per transferred byte. If OBP is true, a byte is transferred and OBS is sent to the station; if false, a NULL byte is transmitted. To terminate the output transfer the station provides an LBO concurrent with the last OBP and then drops SENB. If the station wishes to ABORT a transmission, it just drops SENB without providing an LBO.

In FIG. 7, the following timing relationships are illustrated:

$t_1$: is the maximum time allowed for a station to send the first byte of a frame following SENB going true. A large station latency here will cause a NULL byte to be inserted. A typical value of $t_1$ is 8.5 microseconds.

$t_2$: is the maximum time a station may take to send the next byte. A large station latency here will cause a NULL byte to be inserted. A typical value of $t_2$ is 5.5 microseconds.

$t_3$: time required for the link port to accept the first byte. A typical value of $t_3$ is 80 microseconds.

$t_4$: maximum time a station may take to drop SENB after receiving an OBS. If this time is exceeded the link port will interpret the continuing SENB as an intent to send a new message, and thus, will send a new preamble. A typical value of $t_4$ is 24 microseconds.

Figure 8:
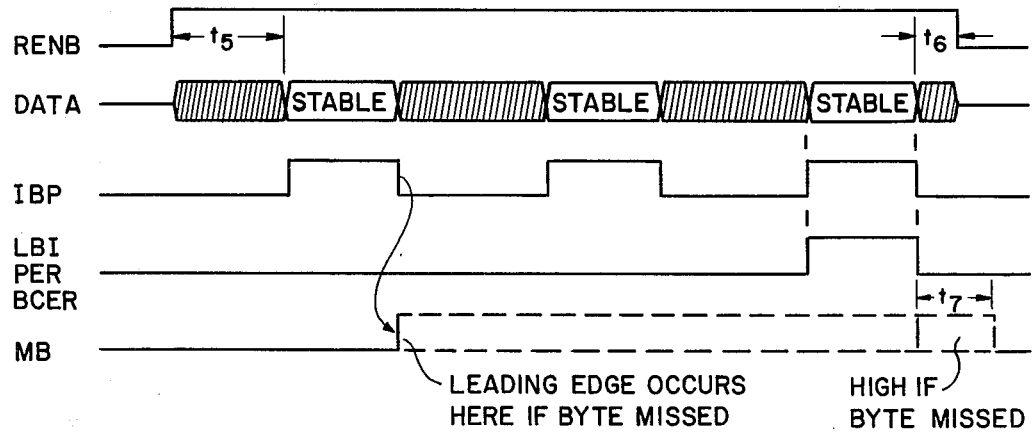
FIG. 8 illustrates the link port to station timing diagram.

FIG. 8 illustrates the timing diagram for a link port to station data transfer. The link port initiates the transfer by raising its RENB line and provides a series of IBP pulses, one for each byte to be transferred. The LBI line is activated concurrently with the last IBP to terminate the transmission. If a parity error (PER) or block check error (BCE) occur, then PER or BCER signals respectively will be transmitted, concurrent with the LBO signal. In FIG. 8:

$t_5$: the time existing after RENB is activated but before the first IBP occurs. Typically, the value of $t_5$ falls in the range of 1 to 5 microseconds.

$t_6$: the time RENB will remain true following an IBP. Typically, the value of $t_6$ is in the range of 1 to 6 microseconds.

$t_7$: the maximum latency allowable after an MB to avoid interference with the following message.

4. Detailed Description—EXTENDED Operation

As shown in FIG. 1, the link 14 is configured for EXTENDED operation and includes, as stated previously, the transmission cable assembly 22, the link ports 24 and the link control station 26. The transmission cable assembly 22 provides the main communication path for link, and thus system communication. When the link 14 is in an EXTENDED configuration, the stations 12 gain access to and master control of the cable assembly 22 according to a bi-level arbitration scheme. The link ports 24 provide the first level of arbitration, and the link control station 26 provides the second level of arbitration. The link control station 26 also provides the security function of time-limiting the grant of master control over system communication to a predetermined time-period.

Figure 9:
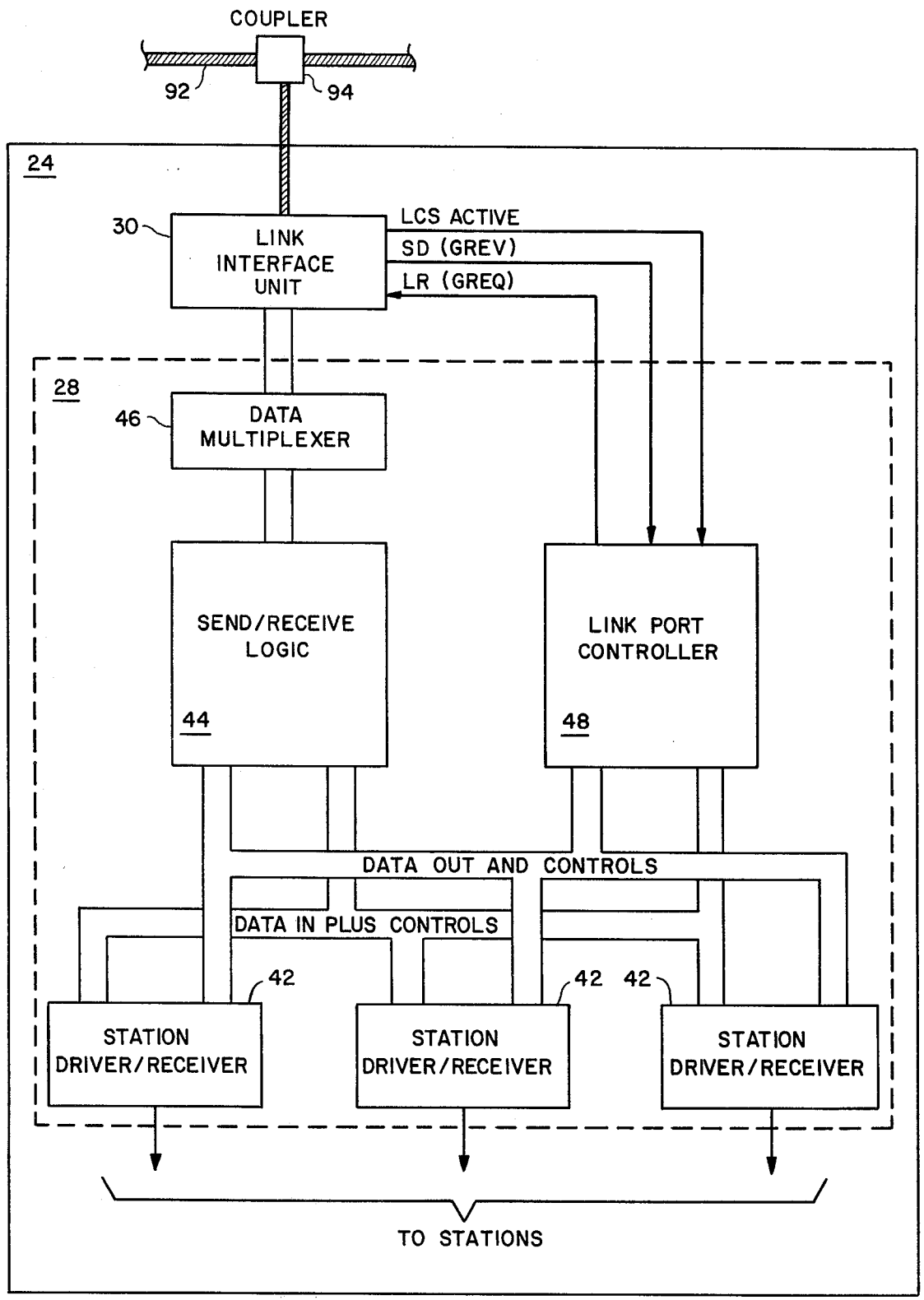
FIG. 9 illustrates, in block diagram form, a link port.

FIG. 9 illustrates, in block diagram form, a link port 24 including the Station Interface Unit (SIU) 28 and the Link Interface Unit 30. Each SIU comprises a number of station drivers/receivers 42, Send/Receive Logic (S/R) 44, a data multiplexer 46 and a Link Port Controller (LPC) 48. The station drivers/receivers 42 provide the differential drive for the data and control lines 32.

The Send/Receive logic (S/R) 44 and the data multiplexer 46 comprise the main subsystems of the SIU. The S/R logic performs the functions of FLAG and NULL byte insertion/deletion, error code generation and checking, and station address insertion/deletion. The data multiplexer performs the functions of serial-to-parallel and parallel-to-serial conversion. Also, in LOCAL mode, as will be described in detail below, the data multiplexer 47 couples to a local transmission cable.

The Link Port Controller (LPC) 48 coordinates communication to and from its link port. The LPC acts as liaison between its link port's stations and the Link Control Station (LCS) 26, as well as, the transmission cable assembly 22.

The main function of the LPC 48 is to arbitrate contention among the stations connected to its link port. In providing the first level of arbitration, the LPC continually scans the STATION REQUEST FLAGS (SREQ) of its respective stations according to their priorities. Preferably, each station is given equal priority (i.e., a round-robin scan) such that all stations have equal opportunity to communicate via the link. In this manner, no station or groups of stations will dominate the link.

For a round-robin scan, the scan sequence is from Station O to Station N and back again to Station O, where N is the number of stations connected to the link port. When an active STATION REQUEST FLAG is sensed, the LPC halts its scanning sequence and determines at what step the scanning has stopped. The number of the step will correspond to the number of the requesting station.

The LPC 48 then issues a GROUP REQUEST FLAG (GREQ) indicating the presence of a requesting station in its group.

The GREQ flag is propagated to the link port's Link Interface Unit (LIU) 30. The LIU 30 will then transmit a GROUP REQUEST TONE to the LCS 26 via the transmission cable assembly 22. Each of the link ports 24 is provided with a separate GROUP REQUEST TONE of a predetermined frequency to characterize the presence of a requesting station in its group.

The LCS 26 will scan the cable assembly 22 to listen for the presence of an active GROUP REQUEST TONE. Upon sensing and selecting an active tone, the LCS will issue a GROUP GRANT MESSAGE to the requesting link port over the cable assembly 22. This message contains the address of the requesting link port, but is sensed by all the link ports. The LIU's 30 of all the link ports will sense the message and will forward the message to their respective S/R logic 44 for decoding. Only the S/R logic 44 of the requesting station will recognize its address and respond thereto by issuing a SGRAN flag to the requesting station thereby selecting it as the master station.

The requesting link port will maintain its GROUP REQUEST TONE active until its requesting station, the present link master, removes its SREQ flag. At that time, the link port, via its LPC, will deactivate its request tone thereby terminating the communication and freeing the link 14 for use by another station. The only exception to this protocol is if the present master station attempts to retain control of system communication for longer than the LHTO period. If this occurs, the LCS 26, as described below, will issue a GROUP REVOCATION TONE for transmission over the cable assembly 22. The revocation tone is sensed by all the link ports, but only the LPC's 48 of the communicating station's link ports will issue a SREV signal to their respective stations (i.e., the master and slave), thereby electrically isolating the stations from the link 14. Preferably, this is accomplished by logically disconnecting the station's interface to its link port. After deactivating its GROUP REQUEST TONE, the LPC will continue its scanning at the next step from which it previously stopped.

The LPC's 48 may also perform various status gathering functions in order to collect information on the operation and health of the link. Such information may be in the form of frame counts, byte counts, MISSED BYTES (MB), block check errors, parity errors and LHTO terminations.

The LPC 48 may be implemented in a number of different designs by one skilled in the art. By way of example only, a microprocessor implementation will be discussed.

Figure 10:
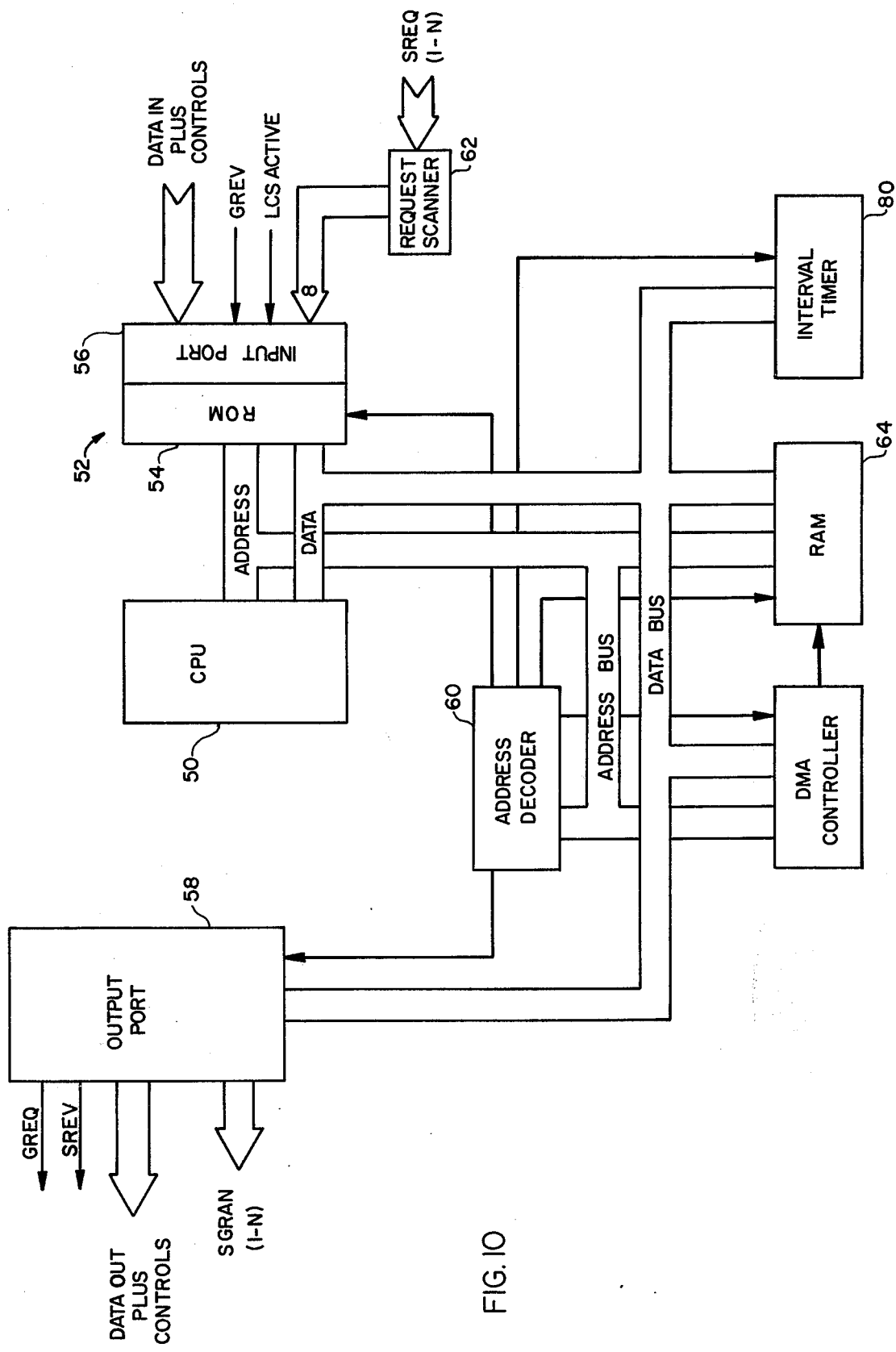
FIG. 10 illustrates, in block diagram form, a link port controller.

FIG. 10 illustrates, in block diagram form, a microprocessor-based LPC implemented with an INTEL 8085A, an eight-bit microprocessor. A CPU 50 provides the main operational control in conjunction with an operational memory 52. The memory 52 preferably includes a ROM 54, and an input port 56 through which all input signals are connected to the LPC. Preferably, the ROM 54 is an INTEL 8355, and the input port 56 is an INTEL 8255A peripheral interface unit. A RAM 64 is provided for data storage.

The LPC 48 interfaces with the stations 12, its LIU 30, and the LCS 26 via an output port 58. An address decoder 60 responds to its link port's address and notifies the CPU 50 to prepare for an incoming communication.

A request scanner 62 is provided to scan the SREQ flags of its link port's respective stations. The scanner 62 looks at the request lines in a round-robin fashion always proceeding in a forward direction (i.e., 0, 1, 2 ... 9, 0, etc.). When an active request is found, the scanner stops and interrupts the CPU 50. The CPU now issues a GREQ flag to its LIU. The LIU, in turn, accepts the GREQ flag and transmits the GREQ tone of its link port to the LCS 26 via the cable assembly 22.

Figure 11:
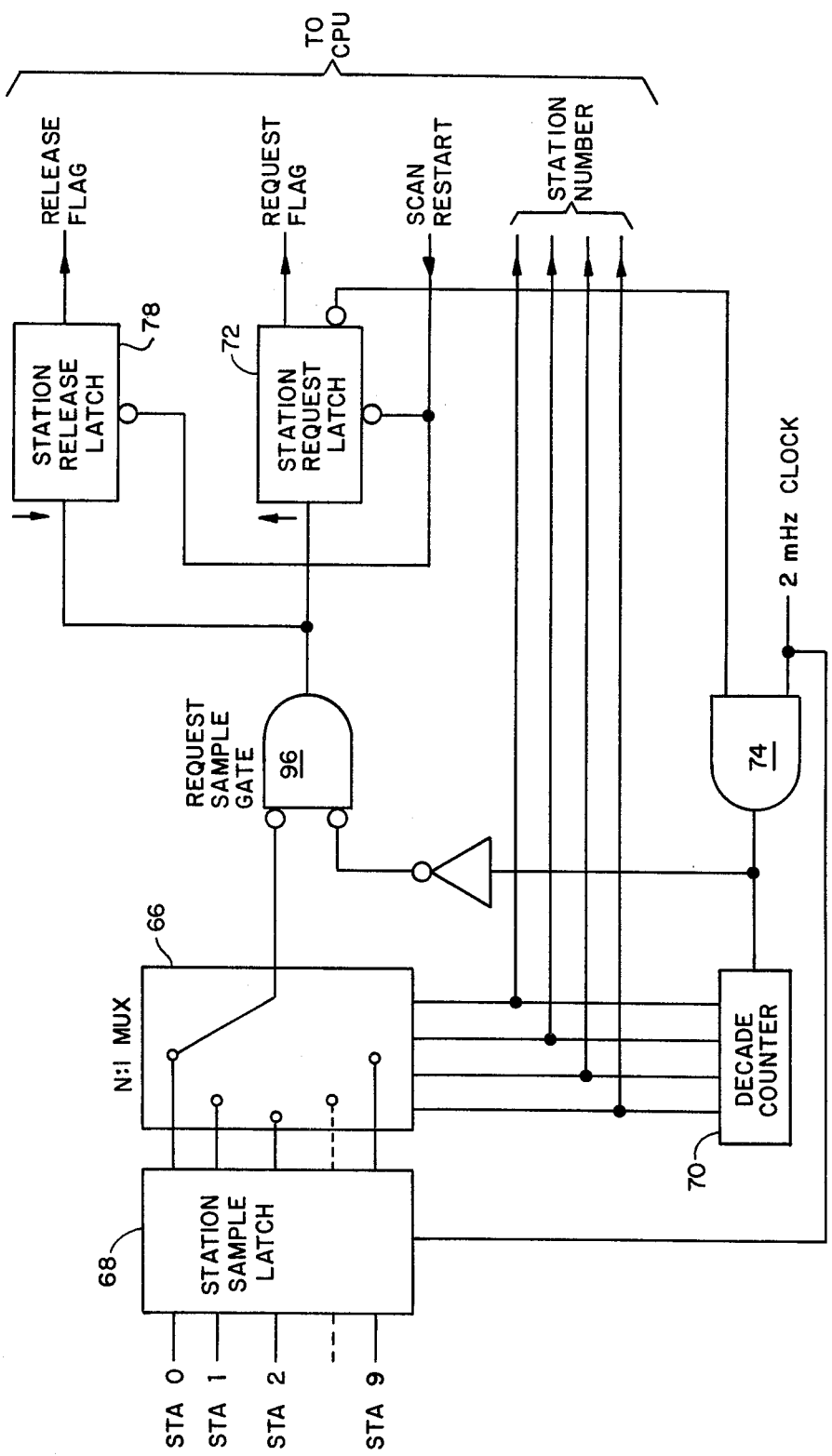
FIG. 11 illustrates, in block diagram form, the request scanner.

The scanner 62 is shown in block diagram form in FIG. 11. The SREQ flags of the link port's stations are coupled to an N:1 multiplexer 66 via a station sample latch 68 (where N is the number of respective stations). The latch 68 is provided to maintain the status of the SREQ flag stable during the multiplexing operation such that no false or improper indications of station's status will be given.

A counter 70 is provided for driving the select lines of the multiplexer 66 to provide the round-robin scanning of the LPC. The counter is designed to have N-1 states and is clocked at a 2 MHz rate. In this manner, each SREQ flag is viewed for a 500 microsecond period.

The output of the multiplexer 66 is sensed by a station request latch 72. The station request latch 72 upon sensing an active flag, disables AND gate 74 which freezes the counter at its present state. The state of the counter is now the address of the station requesting to become link master.

After the station has completed its scan, it drops its SREQ flag. This is sensed by the CPU 50 and it transmits a SCAN RESTART signal to the scanner 62. The SCAN RESTART signal resets latch 72 which in turn, enables gate 74, restarting the scanning. Also, gate 76 is enabled which allows the latch 72 to be set by the next active SREQ flag, and sets station release latch 78 to notify the CPU 50 that the scanning has restarted.

In LOCAL mode, the LPC must supply the timing for the LHTO period, due to the absence of the LCS 26. Thus, each LPC 48 is provided with an interval timer 80 for performing the LHTO function.

The Link Interface Unit (LIU) 30 provides the interface for the link ports to the transmission cable assembly 22. The LIU's are MODEMS (modulators and demodulators) which accept the digital SIU signals, modulate them at the communication frequency for transmission over the cable assembly 22. The LIU's 30 also accept information for the cable assembly, demodulate the information, and transfer the information to their respective SIU's 28.

Figure 12:
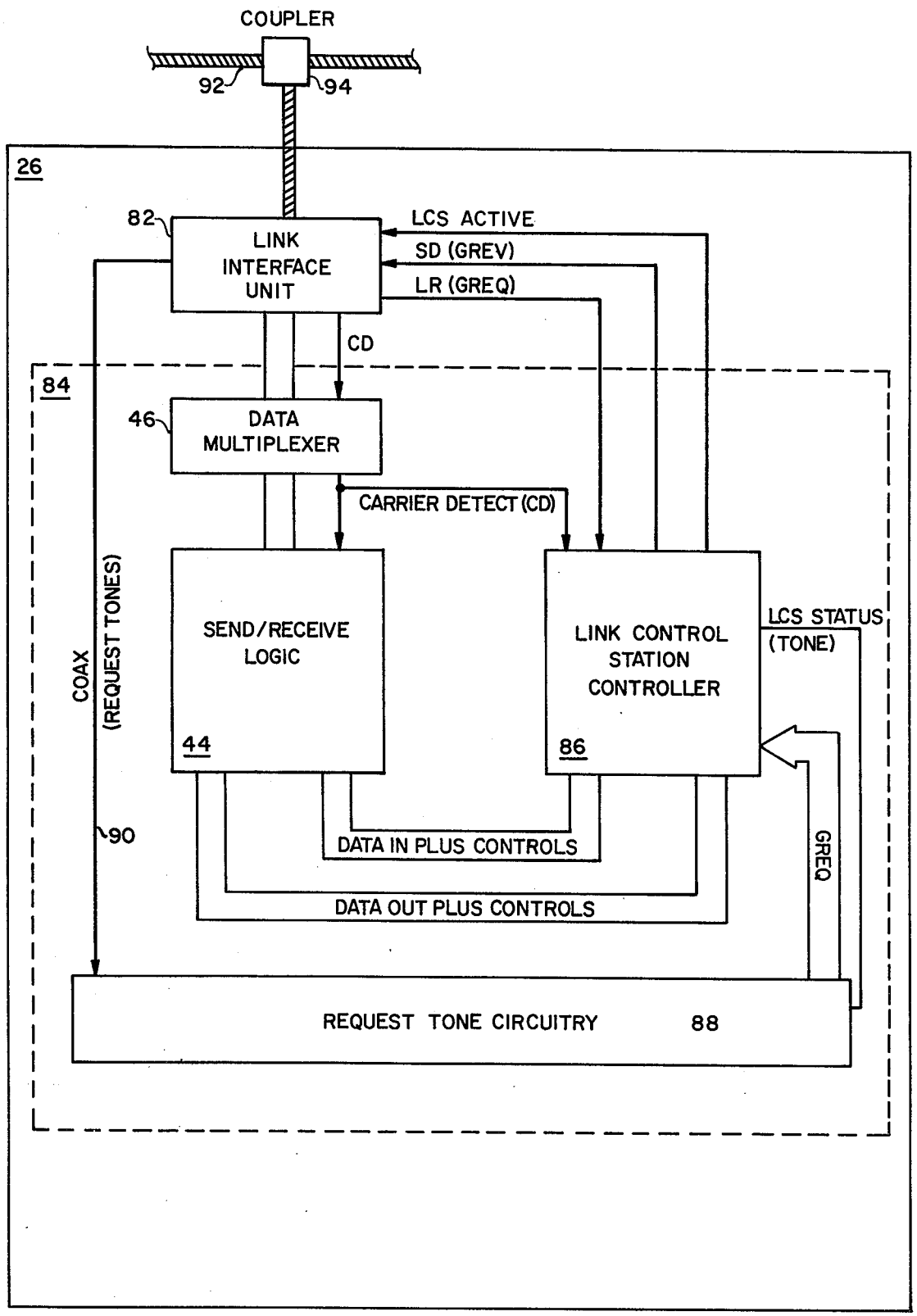
FIG. 12 illustrates, in block diagram form, a link control station.

FIG. 12 illustrates, in block diagram form, a Link Control Station (LCS) 26. The LCS 26 provides two functions for supporting orderly multi-master operation of the link 14. First, the LCS provides a second level of arbitration for resolving contention among station groups for master control of system communication. Second, the LCS provides the communication security function and will electrically disconnect any station which attempts to retain control of the link for greater than the LHTO period. The LCS 26 includes a Link Interface Unit 82, an LCS SIU 84 having an LSC Controller (LCSC) 86, Send/Receive logic 44, and a data multiplexer 46.

Figure 13:
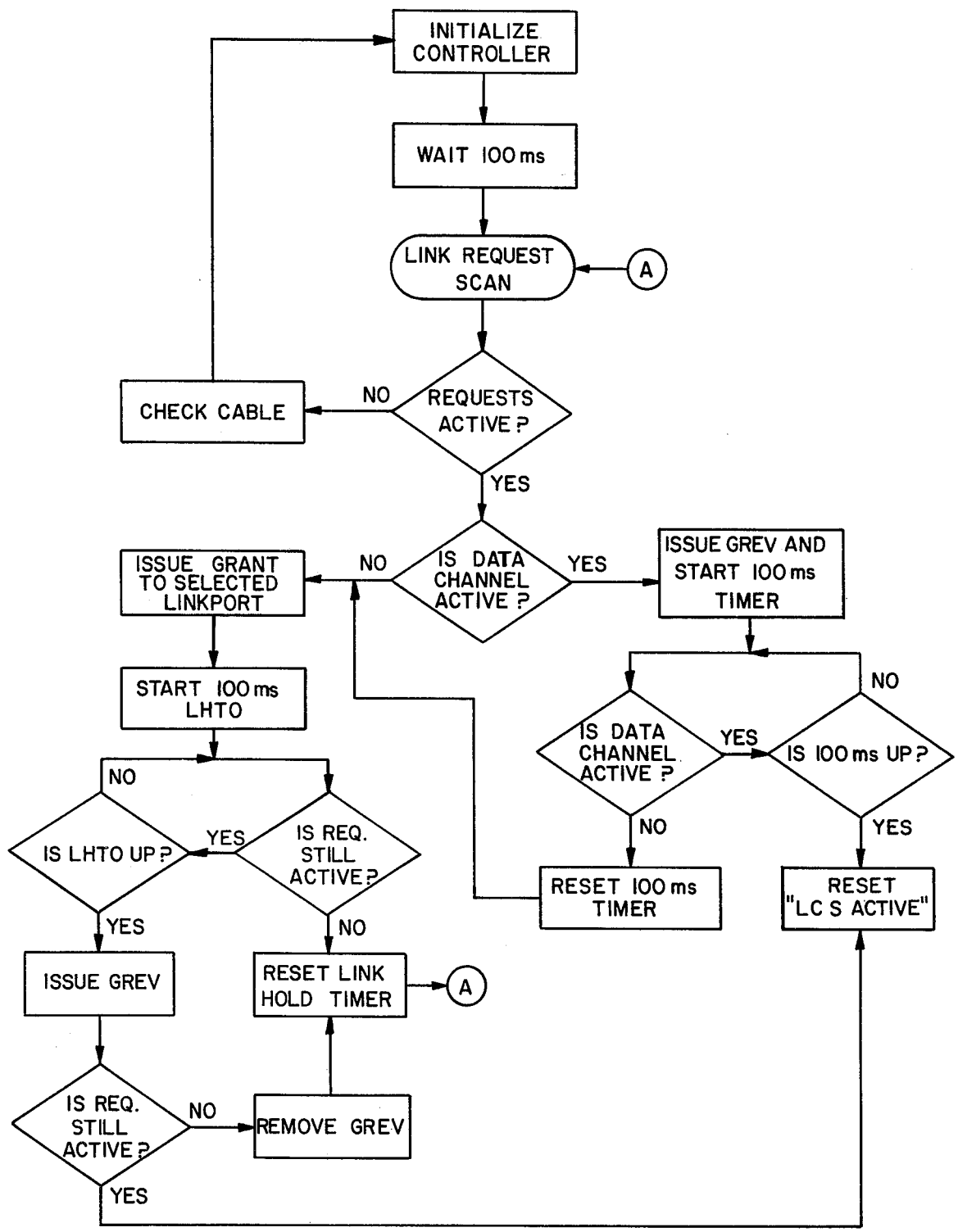
FIG. 13 illustrates, in flow-chart form, the operation of the link control station.
Figure 14:
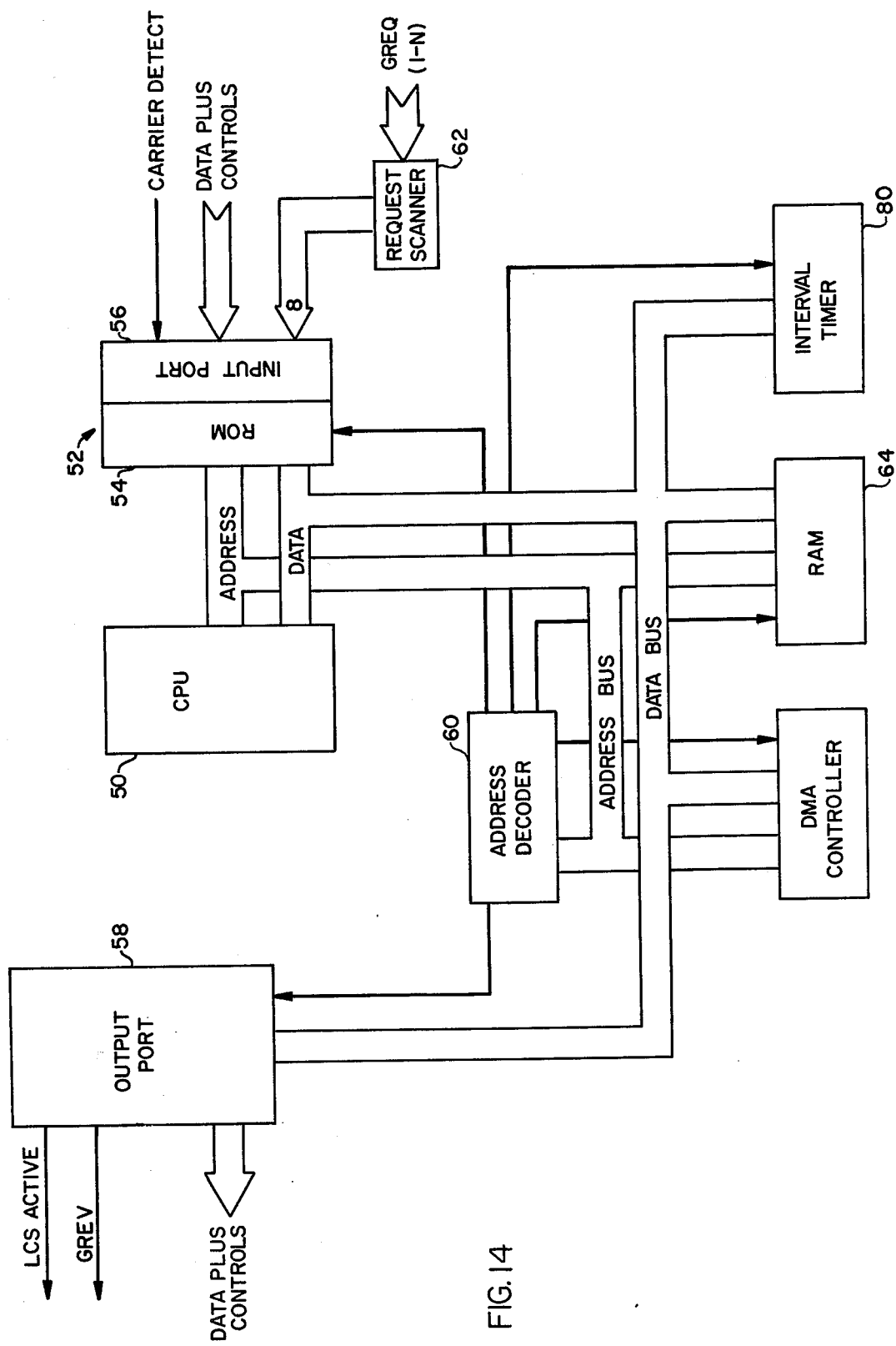
FIG. 14 illustrates, in block diagram form, a LCS controller.

The operation of the LCS is illustrated, in flow-chart form, in FIG. 13. As shown in FIG. 14, the LCSC 84 is of substantially the same design as the LPC 48 and operates in substantially the same manner. Thus, the operation of the LCSC 84 will not be discussed in detail. One aspect of the LCSC 84 will be discussed; that is, the performance of the LHTO function.

The interval timer 80 provides the LHTO period. In operation, the CPU 50 upon issuing a GROUP GRANT MESSAGE, notifies the interval timer 80 of its action. The timer 80, in response to the start of communication, begins to clock the LHTO period via an internal clock (not shown). At the end of the period, the timer 80 notifies the CPU that LHTO is extinguished. If communication is still active, the CPU will issue a GREV tone which is seen by all the link ports 24. Only the link ports of the master and slave stations will respond to the GREV message and will issue a SREV signal to their respective stations to terminate the communication.

Figure 16:
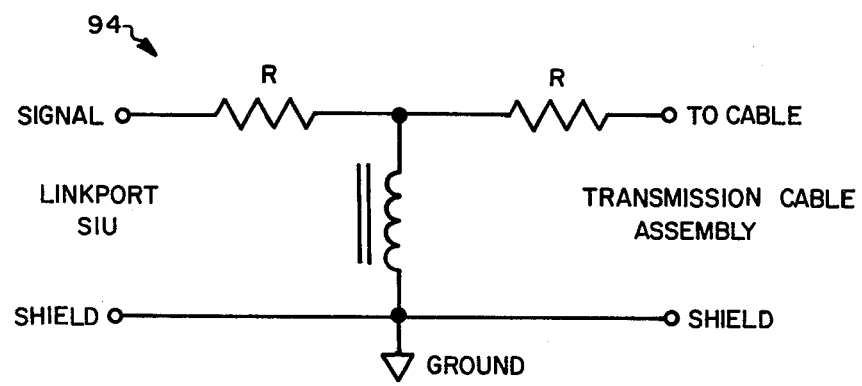
FIG. 16 illustrates, in schematic form, a coupler.

The request tone circuitry 88 includes a number of filter networks (not shown), one for each link port 24, for sensing the individual request tones of the link ports via coax cable 90. The center frequencies of each filter is set at the frequency of its respective link port. By using individual filters and request tones, as well as a separate communication frequency, the cable assembly 22 is frequency multiplexed. That is, requests, data and revocation frequencies may all be transmitted simultaneously along the cable assemly, since each is at a different carrier frequency. This transmission scheme is illustrated in FIG. 16.

Upon sensing an active tone, the circuitry 88 notifies the CPU 50 which in response, halts the operation of the scanner 62. If no other communication is present, the CPU will issue a GROUP GRANT MESSAGE to the requesting link port. If communication is present, the CPU will wait until the communication has terminated, or the lapse of the LHTO period, before issuing a GROUP GRANT MESSAGE. The CPU monitors the presence or absence of communication on the cable assembly by sensing the status of the CARRIER DETECT (CD) line from the LIU 82.

Figure 15:
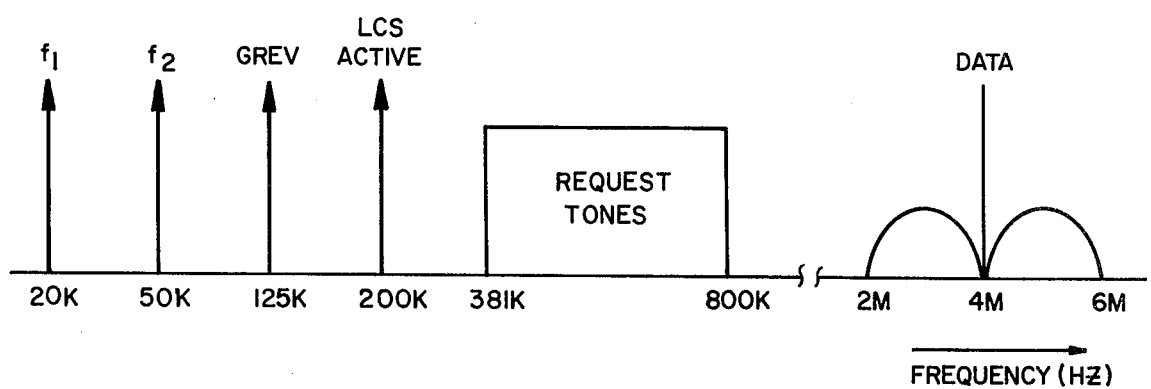
FIG. 15 illustrates the frequency spectrum of the cable assembly 22.

The LCS 26 also provides an LCS ACTIVE tone to indicate to the link ports 24 its status. The tone is of predetermined frequency, as shown in FIG. 15, and is supplied over the cable assembly 22. If the tone is present, the LCS is present and active; if not present, the LCS is either not present or failed. If the LCS fails, all communication via the cable assembly is disabled, but stations connected to the same link port may still communicate with one another. This "soft-fail" mode enables the major control loops to be connected such that an LCS 26 failure does not interrupt their control.

The LCS 26 is preferably designed as a standalone, self-powered unit such that it may be connected to any point along the cable assembly. It has been found, that by connecting the LCS at a point along the cable assembly equi-distant from the furthermost separated link ports, the worst-case effects of propagation delay are greatly reduced.

The LIU 82 is of substantially the same design as the LIU 30, with one additional circuitry. The LIU 82 includes a filter network (not shown) having a band-pass broad enough to bracket the GREQ tone spectrum. In this manner, only GREQ tones are transmitted to the tone circuitry 88, and noise and other extraneous signals are filtered out of the spectrum.

The transmission cable assembly 22 supports link communication by providing a high-speed, long-distance transmission path between the link ports 24 and the LCS 26. The assembly 22 includes a transmission cable 92, couplers 94 and end-tone generators 96.

The transmission cable 92 is suitably chosen to support the communication rate of the link 14. Preferably, the cable 92 is a CATV type coax for supporting the 1 mbps link data rate while allowing the link ports 24 to be physically separated by relatively long distances.

The couplers 94 are provided as impedance matching devices to maintain the proper interface characteristics between the link ports 24, the LCS 26 and the cable 92. FIG. 16 illustrates, in schematic form, a coupler 94.

Figure 17:
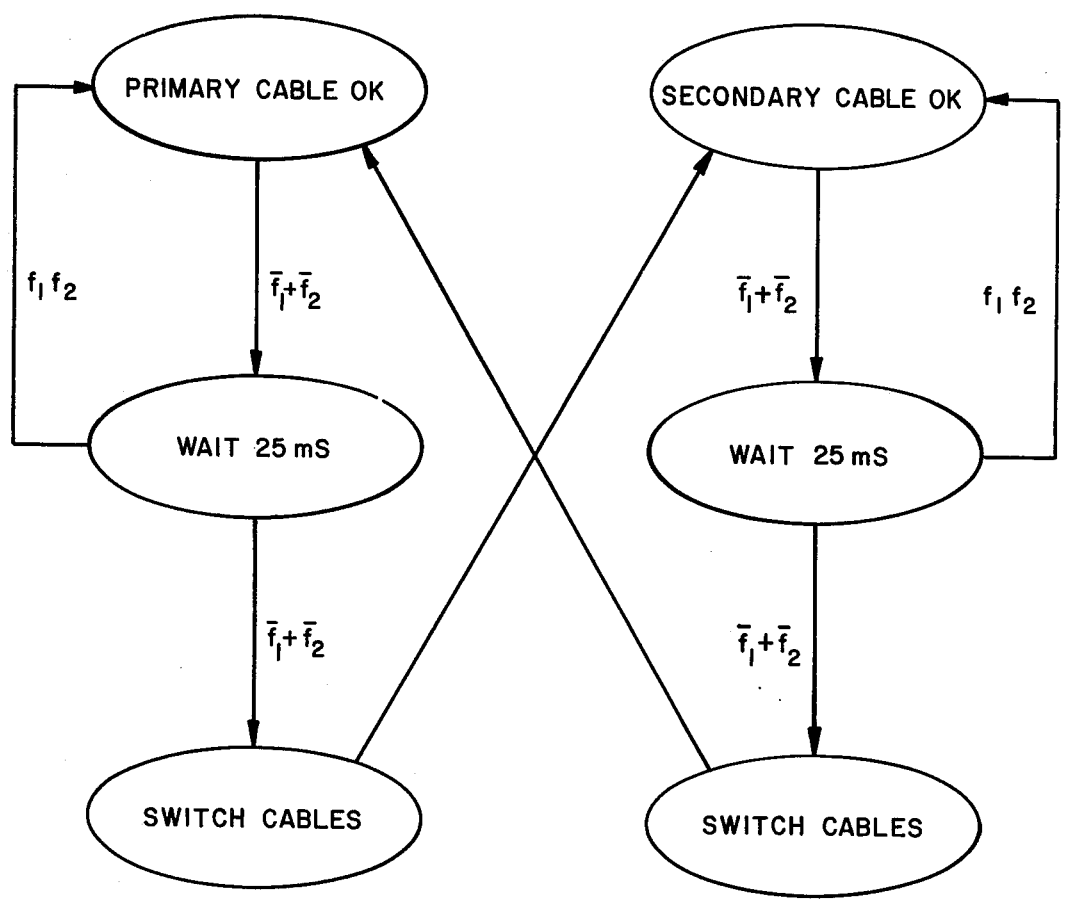
FIG. 17 illustrates the state diagram for cable switching.

In FIG. 1, the end-tone generators 96 are provided for cable break detection and fault isolation. Each of the generators 96 transmits a respective tone of predetermined frequency along the cable 92. These tones are sensed by the link ports 24 and the LCS 26. If both tones are present, the cable is operable and communication can take place. If one or both of the end tones is absent, the cable is inoperable, and communication is either partially or totally lost. By sensing which of the end tones are present, the LSC 26 can determine the health of the cable 92; and thus, if redundant cables are provided, can switch to the backup cable if the primary cable has a fault. FIG. 17 illustrates a cable-switching state diagram, where $f_1$ and $f_2$ represent the two end-tone frequencies. Also, circuitry may be provided to halt the cable switching if both cables are determined to be faulty.

5. Operation

In order for the present invention to be more fully understood, an example of a link transaction will now be discussed.

For purpose of explanation it will be assumed that Station A wishes to communicate with Station B and that both stations are connected to separate link ports.

Station A will attempt to initiate communication by raising its SREQ flag. This act places Station A in contention for master control of system communication with the other stations connected to Link Port 1. Station A must now pass the round-robin arbitration scheme of Link Port 1. That is, the first level of arbitration.

Link Port 1 will issue a GREQ tone upon selecting a requesting station in its group. The GREQ tone does not indicate which station in the group is requesting to become a master station, it only indicates that one station in the group is so requesting.

Concurrently with issuing its GREQ tone, Link Port 1 will halt its round-robin scanning and store the address of the step at which it stopped. This address is the same as the address of the requesting station. If Station A is selected, then Link Port 1 will store its address (i.e., the address of Station A).

Link Port 1 must now compete with other link ports having a station requesting to become a master station. Contention among the link ports is resolved by the link control station 26.

The link control station scans the GREQ tone in a round-robin fashion, and on sensing an active flag will halt its scanning and issue a GROUP GRANT MESSAGE to the selected link port. This message is transferred via the cable assembly 22.

Assuming that Link Port 1 is selected, it will in response to the grant message issue a SGRAN signal to Station A. Station A is now the master station having passed both levels of arbitration.

To communicate Station A must structure its message according to the link protocol, and transfer the message according to the timing shown in FIGS. 7 and 8.

The receiving station, Station B, will then reply and the communication is terminated by the master station deactivating its SREQ FLAG. If the master station attempts to retain control of the link 14 for longer than the LHTO period, the LCS 26 will sense this and issue a GREV tone to terminate the transmission.

6. LOCAL Operation

In FIG. 2, the link 14 is configured for LOCAL operation. In LOCAL the LCS 26 is not utilized and the cable assembly 22 is replaced by the cable 100. The link ports 24, as illustrated, are not provided with LIU's 30, and their LPC's 48 are replaced with LCS-type LPC's 86 (i.e, with Link Control Station Controller).

In LOCAL mode, all the master type stations must be connected to the same link port since there is only one level of arbitration. The other link port(s) are extensions of the main link port (i.e., the one with master stations) and have slave-only type stations connected to them.

The multi-master and security functions are performed by the main (i.e., master station) link port in place of the link control station 26. Otherwise, link operation is like that described for EXTENDED operation.

7. Redundancy

Redundant control systems are commonly used with industrial processes requiring continuous supervision with minimum interruption. This is especially true in distributed control where the individual control subsystems are coupled by a single point of failure element, a transmission cable. If the cable were to fail, all system communication and thus process control would be lost. To overcome this problem, as stated previously, one prior art solution teaches the use of redundant cables operated by a cable selector for sensing which cable is operable and selecting that cable as the communication path. The drawback of this approach is the requirement of third party intervention. The cable selector reduces system efficiency by introducing a delay during "switch-over"; and, reduces system reliability with the addition of another component(s) in the system.

Figure 18:
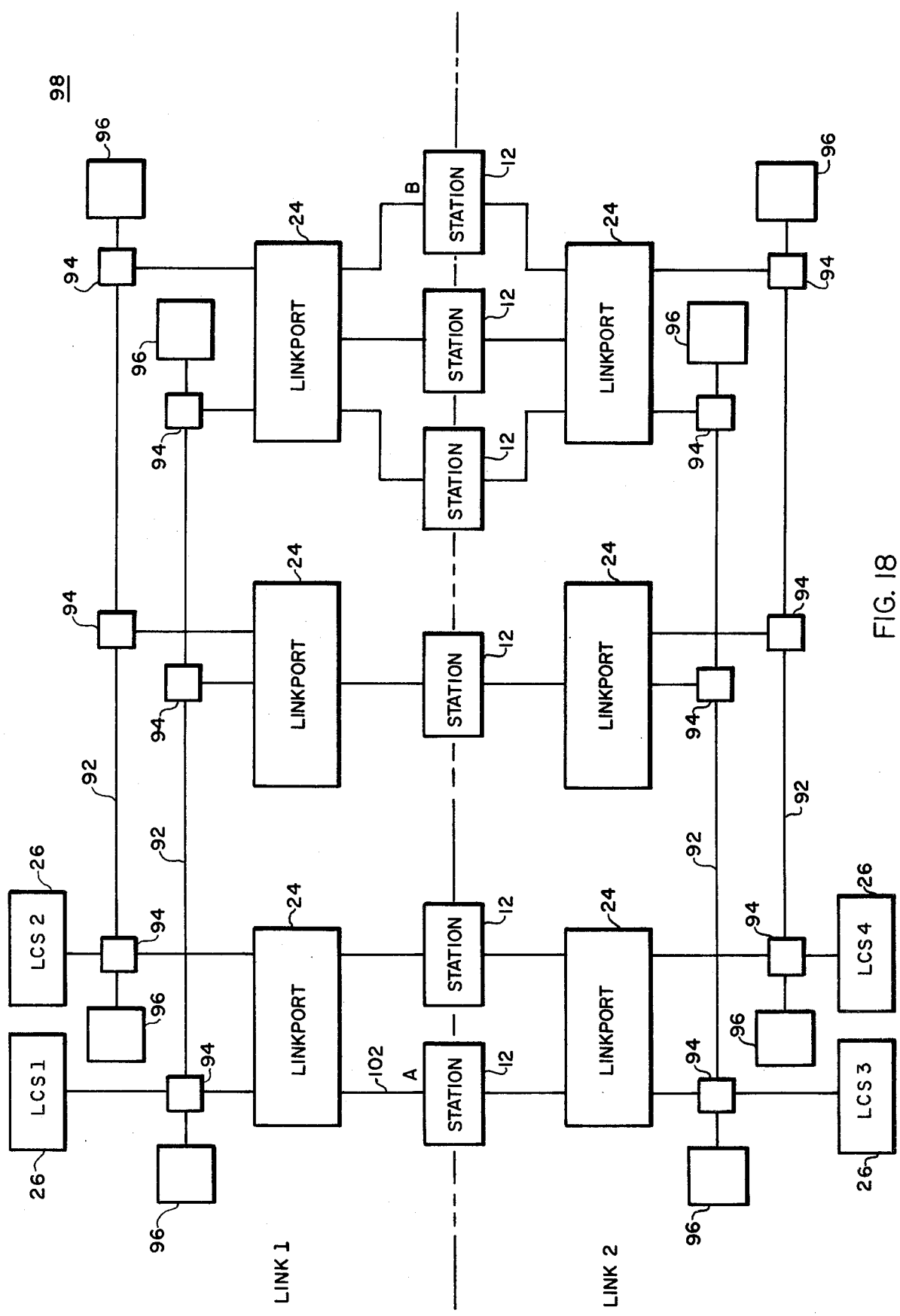
FIG. 18 illustrates dual-redundant process communication links.

FIG. 18 illustrates a process control system 98 incorporating dual-redundant process communication links 14. Each station 12 is provided with two station interface circuits 20, referred to as ports. One port connects the stations to Link 1, the other port connects the stations to Link 2.

Referring to the top portion of the figure, designated Link 1, a single redundant system is illustrated. With this configuration, when Station A desires to communicate with Station B, it proceeds in the normal manner as discussed in SECTION 3. Since the actual configuration of Link 1 is transparent to the stations, Station A is concerned only with transmitting the message to its link port 24 according to the link protocol. Over which cable the message is actually transmitted to Station B is decided by the link ports. By sensing the end-tone frequencies and switching the cables accordingly, as illustrated in FIG. 16, the link ports select the operable cable for communication.

While the redundancy of Link 1 increases the probability that Station A will have a successful communication with Station B, single point of failure elements are still present in the link . Such elements are the station interface circuits 20 and the station-to-link-port cables 102 and the link ports 12. If either of these elements were to fail, the redundant configuration would not be effective to maintain system communication, and process control could be lost.

By providing a second link, Link 2, each station now has two links over which it may communicate. To provide for connection to Link 2, each station 12 includes the second interface circuit 20. One of the links acts as the station's primary link, with the other link being the station's secondary or "back-up" link. For example, assume the primary communication path for Station A is Link 1. If Station A desires to communicate with Station B, it will first attempt to communicate along Link 1. If Link 1 is not available, Station A will attempt to communicate with Station B via Link 2, its back-up link.

The criteria used by the stations in deciding whether a particular link is available for communication may be, for example (1) the lack of a response to a transmission and (2) an abnormal wait for a SGRAN signal.

Also, by allowing the station to choose its communication path, overall system efficiency is increased. That is, if the primary path of a particular station is presently under a heavy "traffic-load", that station may simply choose to communicate along its secondary path rather than wait for the availability of its primary path. In this manner, temporary or permanent changes in the communication paths may be effected by the stations themselves, producing a corresponding increase in the overall efficiency of the system by "off-loading" traffic from the primary path to the secondary path(s). The increased efficiency is seen by each station of the system 98 as an effective increase in its allotted communication window.

It should be noted that the stations 12 may be provided with more than two station interface circuits 20

(ports). The number of such circuits depends upon the number of links a particular station is connected to for communication. Stations such as supervisory computers may have four or eight ports for connection to a like number of communication links.

While only a single embodiment of the present invention has been illustrated and discussed in detail, the present invention is not to be considered limited to the precise construction shown. Various adaptations, modifications and uses of the invention may occur to those skilled in the art to which the invention pertains, and the present invention is to cover all such adaptations, modifications and uses which fall within the spirit and scope of the appended claims.

We claim:

1. In a distributed process control system having a plurality of stations interacting in the control of a complex industrial process having a number of different process conditions, wherein each of said stations include means for generating a station request flag indicating said station's request to become a master station, and a number of said stations further interacting with respective closed-loop control units, each of the control units having means for producing in relation to a respective set-point signal a control signal to operate respective process devices which determine the magnitude of corresponding process variables thereby to effect the desired control of said respective process conditions, a process communication link for providing a secure communication path among said stations such that each station may become a master station to initiate and control system communication, comprising:
   (a) a transmission path for supporting system communication;
   (b) arbitration means for granting to a selected one of said stations master control of system communication, said arbitration means including:
      (i) a plurality of station scanning means each for resolving contention among stations of a respective group of stations vying to become a master station, each of said station scanning means including means for sampling the request flags of their respective stations and for generating in response to an active request flag, a group request signal characterizing the presence of a requesting station in its group;
      (ii) a group scanning means for resolving contention among requesting station groups, said group scanning means for sampling said group request signals and for generating upon sensing an active group request signal a group grant signal for transfer to said requesting scanning means;
      (iii) means in each of said station scanning means for sensing the presence of a group grant means for sensing the presence of a group grant signal and in response thereto for issuing a station grant signal to its requesting station thereby selecting said station as link master; and
   (c) revocation means for time-limiting the grant of master control of system communication to a predetermined time period, said revocation means including:
      (i) timer means for sensing the initiation of communication by a master station, and for generating a revocation signal at the end of said time period if communication is still present on said transmission path; and
      (ii) means in each of said station scanning means for receiving said revocation signal and in response thereto transmitting a station revocation signal to all of its respective stations engaged in said communication thereby terminating said communication.

2. A process communication link according to claim 1 wherein said station request flags are scanned according to the respective priorities.

3. A process communication link according to claim 1 wherein said group request signals are scanned according to the respective priorities.

4. A process communication link according to claim 1 wherein each of said station request flags has equal priority.

5. A process communication link according to claim 1 wherein each of said group request signals has equal priority.

6. In a distributed process control system having a plurality of stations interacting in the control of a complex industrial process having a number of different process conditions, wherein each of said stations includes means for providing a dedicated station request flag indicating a request by said station to initiate and control cable communication, and a number of said stations further interact with respective closed-loop control units, each of the control units having means for producing in relation to respective set-point signals a control signal to operate respective process devices which determine the magnitude of corresponding process variables thereby to effect the desired control of said respective process conditions, said stations including digital computers for calculating updated values of said set-point signals with changing process conditions, video display terminals for displaying the values of said set-points, process variables and process conditions, and data entry terminals for providing operator control of the values of said set-points, an apparatus for arbitrating contention among said stations for master control of system communication such that each of said stations may initiate and control said communication for a predetermined time-period, comprising:
   (a) a transmission path for supporting system communication;
   (b) a plurality of station arbitration means each being coupled to said transmission path and to a respective group of said stations for providing a first level or arbitration among the stations of said respective group of stations;
   (c) each of said station arbitration means having a dedicated interface for each of said stations, each of said arbitration means including first scanning means for sampling said respective station request flags according to a first predetermined priority and for generating in response to an active station request flag a characteristic group request tone;
   (d) group arbitration means for providing a second level of arbitration among station groups for control of said path, said group arbitration means receiving said group request tone and including
      (i) second scanning means for sampling the status of said group request tone according to a second predetermined priority and for generating in response to an active group request tone an access grant message for transfer to said requesting selection means via said transmission path; and,
      (ii) means including a timer for sensing the group request flag of said selected station arbitration means for a predetermined time period and upon completion of said time period for generating an access revocation signal if said selected group request flag remains active;

(e) decoding means in each of said station arbitration means for receiving said access grant messages and for generating in response thereto a station grant signal for transfer to said requesting station thereby selecting said station for access to and master control of said transmission path;

(f) security means in each of said selection means for receiving said access revocation signal and in response thereto producing a station revocation signal for transfer to said selected master station.

7. A process communication link as in claim 6 wherein each of said stations further include means for receiving said station revocation signal and in response thereto for electrically disconnecting said station from said transmission path.

8. An apparatus according to claim 6 wherein said system communication is bi-directional.

9. An apparatus according to claim 6 wherein said transmission path is a CATV-type coax cable.

10. An apparatus according to claim 6 wherein said first priority is a round-robin priority.

11. An apparatus according to claim 6 wherein said second priority is a round-robin priority.

12. An apparatus according to claim 6 wherein said characteristic group request tones are of respective frequencies.

13. An apparatus according to claim 6 wherein said second scanning means includes a plurality of filters, each for sensing a respective one of said group request tones.

14. In a distributed electronic process control system having a plurality of stations interacting to control a complex industrial process having a number of different process conditions, wherein each of said stations include means for providing a dedicated station request flag indicating a request by said station to initiate and control system communication, and the stations interact with respective closed-loop control units for each of the process conditions, each of the control units having means for producing in relation to respective set-point signals a control signal to operate respective process devices which determine the magnitude of corresponding process variables thereby to effect the desired control of said respective process conditions, said stations including digital computers for calculating updated values of said set-point signals with changing process conditions, and data entry terminals for providing operator-control of the values of said set-points, a process communication link comprising:

(a) a transmission cable for supporting bi-directional communication of serially encoded process status and control information among said stations;

(b) a plurality of station interface means each for providing a respective number of said stations with arbitrated access to said cable, each of said interface means being coupled to said cable and including:

(i) first scanning means for sequentially sampling said respective station request flags in a round-robin manner and in response to an active station request flag discontinuing said sampling and producing (1) an access request tone indicating the presence of a requesting station in its group and (2) a status signal indicative of the present position of said scanner;

(c) arbitration means for resolving contention among said station interface means for control of said cable, said arbitration means receiving said access request tone and including:

(i) second scanning means including a plurality of filters, one for each of said tones for sequentially sampling said access request tones in a round-robin manner and in response to an active access request flag discontinuing said sampling and producing (1) an access grant message for transfer to the requesting interface means via said cable and (2) a second station signal indicative of the position of said scanner; and (ii) means including a timer for sensing the access request flag of said selected interface means for a predetermined time period initiated by the generation of said access grant message and at the end of said time period for generating an access revocation signal if said selected interface means access request flag is active;

(d) decoding means in each of said interface means for receiving said access grant message and for generating in response thereto a station grant signal for transfer to said requesting station thereby selecting said station as a master station;

(e) means in each of said stations for receiving said station grant signal and in response thereto initiating station communication;

(f) security means in each of said interface means for receiving said access revocation signal and in response thereto producing a station revocation signal for transfer to said master station; and, (g) means in each of said stations for receiving said station revocation signal and in response thereto (1) deactivating said station's request flag and (2) electrically disconnecting said station from said cable.

15. In a distributed process control system having a plurality of stations interacting to control a complex industrial process having a number of different process conditions, and a bi-directional data bus for supporting the exchange of process status and control information among the stations, wherein the stations each include means to generate a station request flag characterizing said station's request for access to and master control of said data bus; further interact with respective closed-loop control units for producing in relation to respective set-point signals a control signal to operate respective process devices which determine the magnitude of corresponding process variables thereby to effect the desired control of said respective process conditions, said station including digital computers for calculating updated values of said set-point signals with changing process conditions, video display terminals for displaying the values of said set-points, process variables and process conditions, and data entry terminals for providing operator-control of the values of said set-points, a method of arbitrating contention among said stations for access to said transmission path such that each of said stations may gain access to said data bus to control the transfer of information for a predetermined time period, said method comprising the steps of:

(a) arbitrating among stations of respective groups of stations for access to data bus according to a first predetermined priority including:

(i) sampling said station request flags of each individual group; and, (ii) generating for each of said groups in response to a respective active station request flag a respective group request tone indicating the presence of a requesting station in said group;

(b) providing a second level of arbitration for resolving contention among said station groups for control of said data bus including:
  (i) sampling said group request tones; and,
  (ii) generating in response to an active group request tone an access grant message for transfer to said requesting selection means via said data bus;

(c) decoding said access grant message and in response thereto generating a station grant flag or transfer to said requesting station thereby selecting said requesting station for access to and master control of said data bus;

(d) time-limiting said access and control of said data bus of said selected station including:
  (i) sensing the group access flag of the respective group of said selected station for a predetermined time period;
  (ii) generating an access revocation signal for transfer to said selected station upon completion of said time period if said respective group access flag remains active.

16. A method as in claim 15, further including the step of providing each of said stations with security means for receiving said access revocation signal and in response thereto electrically disconnecting said station from said data bus.

17. A method of providing secure communication among a plurality of stations interacting to control a complex industrial process having a number of different process conditions, wherein the stations each include means for generating a dedicated station request flag indicating a request by said station to initiate and control an information transfer; interact with respective closed-loop control units for each of the process conditions, each of the control units having means for producing in relation to respective set-point signals a control signal to operate respective process devices which determine the magnitude of corresponding process variables thereby to effect the desired control of said respective process conditions, said stations including digital computers for calculating updated values of said set-point signals with changing process conditions, video display terminals for displaying the values of said set-points, process variables and process conditions, and data entry terminals for providing operator-control of the values of said set-points, said method comprising the steps of:

(a) arbitrating contention among stations of respective groups of said stations for access to said cables including:
  (i) sequentially sampling said respective station request flags in a round-robin manner and in response to an active station request flag discontinuing said sampling and producing (1) an access request tone indicating the presence of a requesting station and (2) a status signal indicative of the position of said scanner;

(b) arbitrating contention among said station groups for control of cable communication including:
  (i) sequentially sampling said access request tones in a round-robin manner and in response thereto discontinuing said sampling and generating (1) an access grant message for transfer to said requesting station via said cable and (2) a second status signal indicating the position of said scanner; and,
  (ii) activating upon generation of said access grant message a timer of a predetermined period and upon completion of said time period generating an upon completion of said time period generating an access revocation signal if said selected access request signal remains active;

(c) generating in response to a received access grant message a station grant signal for transfer to said requesting station thereby selecting said station as a master station.

18. In a system for controlling a complex industrial process of the type having a large number of process conditions, such as temperature, fluid flow rate, and so forth, which conditions are to be maintained at respective set point magnitudes alterable in accordance with certain changeable process requirements, said control system comprising a plurality of separate but interactive stations organized in a number of preselected groups, each of said stations developing station request flag signals when communication is required by any of said stations with another of said stations; at least some of said stations being arranged to be coupled to corresponding process control unit means including control units of the type which are responsive to condition measurement signals and are operable to produce control signals for respective process devices such as flow control valves functioning to adjust process variables to maintain corresponding process conditions at selected set-point values;

said process control system further including a process communication link providing communication between any one of said stations developing a request flag signal and a second station to which a message is to be directed by said requesting station; said process communication link comprising:

(a) a plurality of link ports each assigned to a corresponding one of said preselected groups of stations;

(b) transmission means interconnecting all of said link ports and including means to provide bi-directional communication therebetween;

(c) each of said link ports including:
  (1) means to receive said station request flag signals from all stations of the group assigned to the link port;
  (2) scanning means coupled to said receiving means and operable to detect a station request flag signal received from any of said assigned group of stations;
  (3) means to deactivate the further functioning of said scanning means upon detection of a station request flag signal;
  (4) means responsive to the detection of a station request flag signal by said scanning means for developing and coupling to said transmission means a group request flag signal including an identification of the link port originating the group request flag signal;

(d) a link control coupled to said transmission means and including:
  (5) means to receive all of the group request flag signals from said link ports;
  (6) scanning means coupled to said receiving means (5) and operable to detect a group request flag signal received from any of said link ports;
  (7) means responsive to the detection of a group request flag signal for developing and coupling to said transmission means a group grant signal including an identification of the link port for the station to be granted communication access to said transmission means;

(e) all of said link ports further including:

(8) means coupled to said transmission means to receive all of the group grant signals produced by said link control station and to recognize the signals identifying the associated link port;

(9) means responsive to said receiving a recognition means for developing a station grant signal upon recognition of a group grant signal identifying the associated link port;

(10) means jointly operable with said responsive means (9) for directing said station grant signal to the station which originated the original station request flag signal; and

(11) means coupling any of the assigned stations to said transmission means whereby a station upon receipt of a station grant signal can commence transmitting a message to any other of said stations.

* * * * *